July 11, 1933.  E. WIDING  1,917,480
DISPENSING CONTAINER FOR SLICED BREAD AND THE LIKE
Filed Aug. 14, 1931
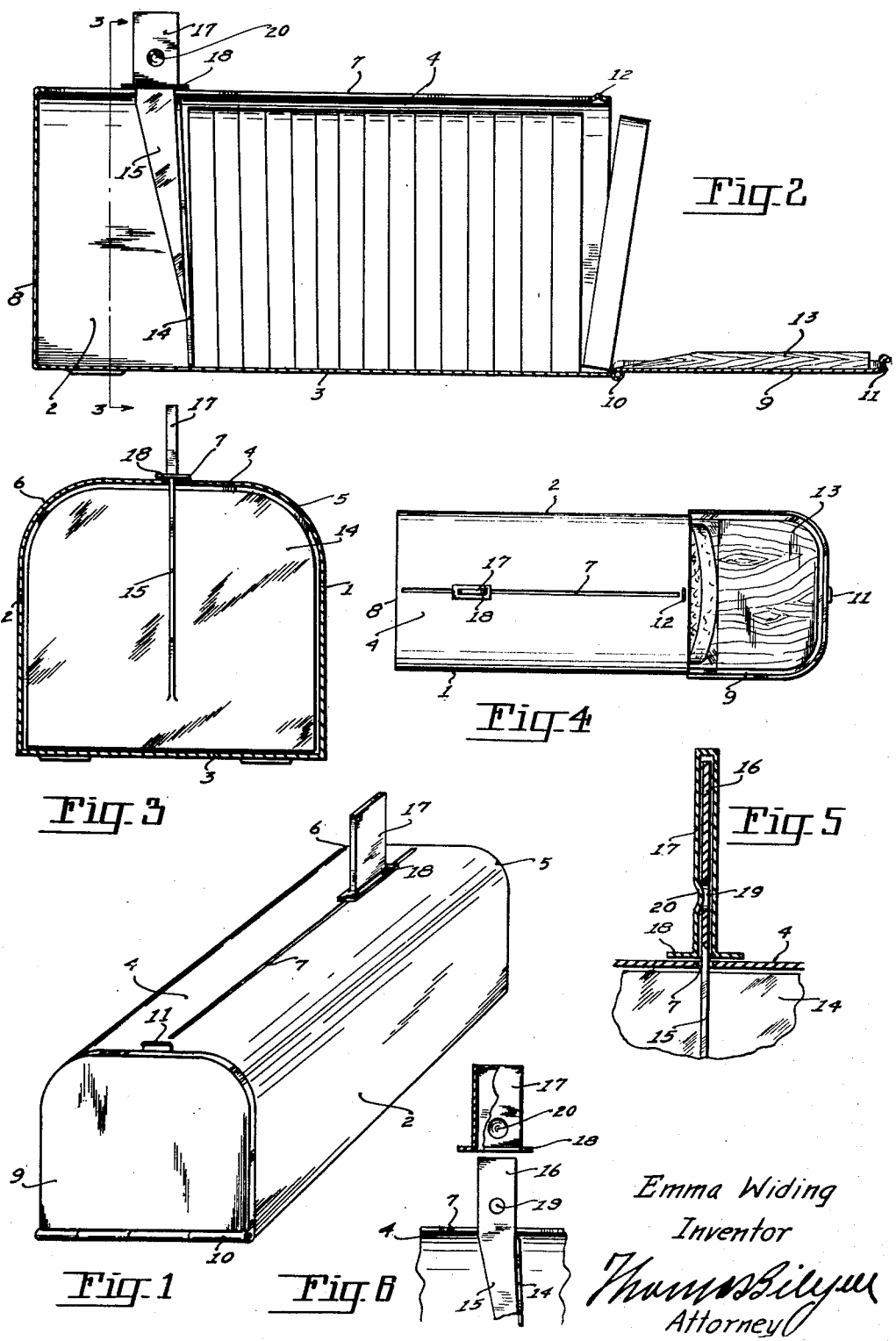
Emma Widing
Inventor
Attorney Patented July 11, 1933

1,917,480

UNITED STATES PATENT OFFICE

EMMA WIDING, OF PORTLAND, OREGON

DISPENSING CONTAINER FOR SLICED BREAD AND THE LIKE

Application filed August 14, 1931. Serial No. 557,140.

My invention is intended as a storage reservoir for bread, cake and the like and particularly adapted for the maintaining therein of sliced bread, cake and the like and for dispensing the same therefrom.

Loaf material may be maintained therein with equal facility and be sliced, at the discharge end of the receptacle, as the same emerges therefrom.

The device is comprised primarily and preferably made of sheet metal having a slit disposed longitudinally of and through the top side of the body portion of the container, through which the shank of the dash passes.

A hand engaging handle is lockably attachable to the outer end of the shank and a guard terminates the lower end of the handle, the purpose of which is to maintain the dash in substantially a vertical position.

A hinged closure is disposed at the discharge end of the container and a non-metallic knife engaging piece is disposed upon the inner side of the hinged closure, the purpose of which is to facilitate the cutting of the loaf thereupon in slices.

The object of my invention is to provide a simply constructed container for single loaves of bread, cake and the like.

The device is particularly adapted for the maintaining of sliced bread therein and from which the loaf, in slices, may be discharged from the container, as desired.

The device is made relatively tight with the slit through which the shank passes, being sufficiently wide to aerate the device and to prevent mould forming upon the material being stored therein.

The device is preferably made of metal to facilitate the maintaining of the same in a highly sanitary condition.

A further object of my invention consists in so constructing the body of the device that the same will receive the loaf material therein and to closely encompass the same.

A still further object of my invention consists in providing a container for loaf material with facilities for ejecting the same therefrom and for slicing the same upon a slicing board that is formed integral with, or secured to the inner surface of the hinged surface of the device.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, end view of the assembled device.

Fig. 2 is a sectional, side view of the assembled device, illustrating the closure as being hinged downward and illustrating a loaf of sliced material disposed within the container.

Fig. 3 is a sectional end view of the mechanism illustrated in Fig. 2. The same being taken on line 3—3 of Fig. 2, looking in the direction indicated.

Fig. 4 is a top, plan view of the mechanism illustrated in Fig. 2 and illustrating the same in the same position with the hinged closure open, as that illustrated in Fig. 2.

Fig. 5 is a fragmentary, sectional, end view of the dash and of the handle secured to the upper end of the shank of the dash.

Fig. 6 is a side view partially in section, of the dash and shank and illustrating the handle removed from the shank, in which position the dash may be removed from the container.

Like reference characters refer to like parts throughout the several views.

I preferably form my device as having parallelly disposed side walls 1 and 2 and having a bottom wall 3 disposed at substantially right angles to that of the side walls. A top wall 4 is parallelly disposed to that of the bottom wall 3 and rounded corners 5 and 6 connect the top with the side walls.

A relatively narrow slit 7 is disposed centrally and extends for the major portion of the length of the top wall 4.

The rear end of the body element is closed by the rear end wall 8. A front closure 9 is hingedly secured to the bottom wall as by hinges 10. A locking latch 11 is disposed at the outer end of the hinged closure 9. The locking latch being adapted to engage upon the locking projection 12 that is disposed substantially centrally of the outer end of the top wall 4 of the body element.

I place a cutting member 13 of non-metallic material upon the inner surface of the hinged closure 9. If an uncut loaf is to be stored within the container the same may be cut directly upon the bread, or cake board 13 without the dulling of the cutting instrument.

A dash 14 is vertically disposed within the body element that is adapted to engage the inner end of the loaf and for ejecting the loaf from the body element. A shank 15 is disposed upon the inner surface of the dash and the outer end 16 of the shank is adapted to receive a handle 17 thereupon.

A guard 18 terminates the lower end of the handle and is so positioned as to engage the upper surface of the top 4 of the body element and to slide therealong. The guard being sufficiently long to substantially maintain the dash in a vertical position.

A locking recess 19 is disposed within the shank and an indentation 20 is disposed within the handle and is adapted to enter the recess 19 and to lock the handle to the shank. Upon the removal of the handle from the shank the dash may be removed from the body element to facilitate the cleaning of the same.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, comprising a body element adapted to contain a loaf of bread, the cross sectional area of which is substantially the same as the loaf to be maintained therein, the combination of a closure disposed at one end of the body element and hinged relative to the bottom of the body element, and adapted to be locked to the body element, a non-metallic strip secured to the inner surface of the hinged closure, a relatively narrow slit extending centrally of and substantially for the full length of the top of the body element, a dash vertically disposed within the body element having a shank disposed at the rear side thereof, said shank upwardly extending and slidably disposed within the slit, a hollow handle removably attachable to the upper end of the shank, a guard terminating the lower end of the handle adapted to maintain the vertical position of the dash, and means for clamping the handle to the shank, said means comprising an indentation on the shank, and a recess in the side wall of the hollow handle adapted to engage therewith.

2. In a device of the class described, comprising a body element adapted to snugly embrace a loaf of bread to be maintained therein, the combination of a closure hingedly secured to the discharge end of the body element, a cutting board disposed upon the inner surface of the hinged closure, a relatively narrow slit disposed in the top wall of the body element, a dash having a shank secured thereto disposed within the body element with the shank thereof slidably disposed within the slit and extending thereabove, and a handle having a guard disposed upon its lower end adapted to maintain the dash in a vertical position removably secured to the shank, said dash being correspondingly shaped to the inner surfaces of the body element.

EMMA WIDING.